United States Patent
Richman et al.

(10) Patent No.: US 10,455,270 B2
(45) Date of Patent: Oct. 22, 2019

(54) CONTENT SURFING, PREVIEW AND SELECTION BY SEQUENTIALLY CONNECTING TILED CONTENT CHANNELS

(71) Applicant: SONY CORPORATION, Tokyo (JP)

(72) Inventors: Steven Martin Richman, San Diego, CA (US); Jason Clement, San Diego, CA (US)

(73) Assignee: Sony Corporation, Tokyo (JP)

(*) Notice: Subject to any disclaimer, the term of this patent is extended or adjusted under 35 U.S.C. 154(b) by 251 days.

(21) Appl. No.: 15/070,266

(22) Filed: Mar. 15, 2016

(65) Prior Publication Data

US 2017/0269804 A1    Sep. 21, 2017

(51) Int. Cl.
| | |
|---|---|
| *H04N 21/41* | (2011.01) |
| *G06F 3/0482* | (2013.01) |
| *H04N 21/482* | (2011.01) |
| *H04N 21/422* | (2011.01) |
| *H04N 21/431* | (2011.01) |
| *H04N 21/466* | (2011.01) |
| *H04N 21/472* | (2011.01) |
| *H04N 21/4782* | (2011.01) |
| *H04N 21/643* | (2011.01) |

(52) U.S. Cl.
CPC ....... *H04N 21/4126* (2013.01); *G06F 3/0482* (2013.01); *H04N 21/42224* (2013.01); *H04N 21/4316* (2013.01); *H04N 21/466* (2013.01); *H04N 21/472* (2013.01); *H04N 21/4782* (2013.01); *H04N 21/4823* (2013.01); *H04N 21/64322* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 5,655,112 | A | 8/1997 | MacInnis |
| 6,020,930 | A | 2/2000 | Legrand |
| 6,061,056 | A | 5/2000 | Menard et al. |
| 6,615,408 | B1 | 9/2003 | Kaiser et al. |
| 6,662,177 | B1 * | 12/2003 | Martino ............. G06Q 10/02 |

(Continued)

FOREIGN PATENT DOCUMENTS

| | | |
|---|---|---|
| CN | 101031069 A | 9/2007 |
| CN | 102404627 A | 4/2012 |

(Continued)

OTHER PUBLICATIONS

Steven Martin Richman, Jason Clement, Frederick J. Zustak, "Multiview as an Application for Physical Digital Media", related U.S. Appl. No. 15/070,447, Applicant's response to Final Office Action filed Sep. 12, 2017.

(Continued)

*Primary Examiner* — Beau D Spratt
(74) *Attorney, Agent, or Firm* — John L. Rogitz

(57) ABSTRACT

A multi-window user interface (UI) is presented in various configurations and operational uses to leverage the relatively large display canvas afforded by large screen display devices such as 4K or 8K displays. Along with the various "Multiview" aspects, content delivery techniques, content selection techniques, and level of service techniques also are presented.

16 Claims, 14 Drawing Sheets

(56) References Cited

U.S. PATENT DOCUMENTS

| | | |
|---|---|---|
| 7,103,904 B1 | 9/2006 | Blackketter et al. |
| 7,197,708 B1 | 3/2007 | Frendo et al. |
| 7,480,872 B1 | 1/2009 | Ubillos |
| 8,244,829 B2 | 8/2012 | Tanaka et al. |
| 8,306,522 B1 | 11/2012 | Delker et al. |
| 8,312,486 B1 | 11/2012 | Briggs et al. |
| 8,316,394 B2 | 11/2012 | Yates |
| 8,332,889 B2 | 12/2012 | Calzone |
| 8,370,874 B1* | 2/2013 | Chang ............... H04N 21/4532 |
| | | 725/44 |
| 8,473,984 B1 | 6/2013 | Harmon et al. |
| 8,683,519 B2 | 3/2014 | McCarthy et al. |
| 8,752,206 B2 | 6/2014 | Joseph et al. |
| 8,832,738 B2 | 9/2014 | Shanks et al. |
| 8,918,411 B1* | 12/2014 | Latif ................ G06F 17/30029 |
| | | 707/687 |
| 8,925,024 B2 | 12/2014 | Wright et al. |
| 9,462,028 B1 | 10/2016 | Levinson et al. |
| 9,733,809 B1* | 8/2017 | Greene ............... G06F 3/0484 |
| 9,894,404 B2 | 2/2018 | Richman et al. |
| 9,906,751 B2* | 2/2018 | Park ........................ H04N 5/50 |
| 10,009,658 B2 | 6/2018 | Richman et al. |
| 2002/0165770 A1 | 11/2002 | Khoo et al. |
| 2002/0184339 A1 | 12/2002 | Mackintosh et al. |
| 2003/0020671 A1 | 1/2003 | Santoro et al. |
| 2003/0174160 A1 | 9/2003 | Deutscher et al. |
| 2004/0128317 A1 | 7/2004 | Sull et al. |
| 2006/0095950 A1 | 5/2006 | Coonce et al. |
| 2007/0038570 A1 | 2/2007 | Halbritter et al. |
| 2007/0107010 A1 | 5/2007 | Jolna et al. |
| 2007/0182809 A1 | 8/2007 | Yarid et al. |
| 2007/0283008 A1 | 12/2007 | Bucher et al. |
| 2008/0295037 A1* | 11/2008 | Cao ...................... G06F 3/0482 |
| | | 715/852 |
| 2009/0083824 A1 | 3/2009 | McCarthy et al. |
| 2009/0132682 A1 | 5/2009 | Counterman |
| 2009/0204929 A1* | 8/2009 | Baurmann ......... H04N 5/44543 |
| | | 715/836 |
| 2009/0217336 A1 | 8/2009 | Chang et al. |
| 2009/0219442 A1 | 9/2009 | Hironaka et al. |
| 2009/0228943 A1 | 9/2009 | Ramaswamy et al. |
| 2010/0027966 A1 | 2/2010 | Harrang et al. |
| 2010/0064313 A1 | 3/2010 | Beyabani |
| 2010/0153999 A1 | 6/2010 | Yates |
| 2010/0157157 A1 | 6/2010 | Yi |
| 2011/0055762 A1 | 3/2011 | Jung et al. |
| 2011/0113336 A1 | 5/2011 | Gunatilake |
| 2011/0296312 A1* | 12/2011 | Boyer .................. G06F 3/0488 |
| | | 715/736 |
| 2012/0023524 A1* | 1/2012 | Suk ................ H04N 21/42222 |
| | | 725/43 |
| 2012/0173981 A1 | 7/2012 | Day |
| 2012/0179833 A1 | 7/2012 | Kenrick et al. |
| 2012/0271970 A1 | 10/2012 | Mason |
| 2012/0278725 A1* | 11/2012 | Gordon .............. H04N 21/2665 |
| | | 715/738 |
| 2012/0284745 A1 | 11/2012 | Strong |
| 2013/0060969 A1 | 3/2013 | Ylikoski et al. |
| 2013/0106690 A1* | 5/2013 | Lim ...................... G07F 13/065 |
| | | 345/156 |
| 2013/0125050 A1 | 5/2013 | Goshey |
| 2013/0185642 A1* | 7/2013 | Gammons ............ G06F 3/0482 |
| | | 715/733 |
| 2013/0188097 A1 | 7/2013 | Smith |
| 2013/0194296 A1 | 8/2013 | Lee |
| 2013/0232148 A1* | 9/2013 | MacDonald ...... G06F 17/30873 |
| | | 707/740 |
| 2013/0278828 A1 | 10/2013 | Todd |
| 2014/0006951 A1* | 1/2014 | Hunter .................. H04H 60/31 |
| | | 715/719 |
| 2014/0040742 A1 | 2/2014 | Park et al. |
| 2014/0059605 A1 | 2/2014 | Sirpal et al. |
| 2014/0072270 A1 | 3/2014 | Goldberg et al. |
| 2014/0082661 A1 | 3/2014 | Rahnstoever et al. |
| 2014/0195675 A1* | 7/2014 | Silver ................ H04L 65/1083 |
| | | 709/224 |
| 2014/0253801 A1 | 9/2014 | Richman et al. |
| 2014/0253802 A1 | 9/2014 | Clift et al. |
| 2014/0337791 A1* | 11/2014 | Agnetta ................ G06F 3/0481 |
| | | 715/784 |
| 2015/0074721 A1 | 3/2015 | Fishman et al. |
| 2015/0187324 A1 | 7/2015 | Kim et al. |
| 2015/0212664 A1* | 7/2015 | Freer ..................... G06F 3/0482 |
| | | 705/14.54 |
| 2015/0297311 A1 | 10/2015 | Tesar |
| 2015/0310896 A1* | 10/2015 | Bredow ................ G06F 3/0488 |
| | | 386/230 |
| 2015/0319473 A1 | 11/2015 | Farkash et al. |
| 2015/0324947 A1 | 11/2015 | Winograd et al. |
| 2015/0356195 A1 | 12/2015 | Kilzer |
| 2016/0011743 A1 | 1/2016 | Fundament |
| 2016/0034159 A1 | 2/2016 | Vranjes et al. |
| 2016/0110901 A1* | 4/2016 | Connolly ................ G06T 11/60 |
| | | 345/661 |
| 2016/0112752 A1 | 4/2016 | Selvaraj |
| 2016/0132217 A1* | 5/2016 | Asokan ............. G06Q 30/0255 |
| | | 715/719 |
| 2017/0139548 A1* | 5/2017 | De Las Heras ....... G06F 3/0482 |

FOREIGN PATENT DOCUMENTS

| | | |
|---|---|---|
| EP | 2487898 A1 | 8/2012 |
| IN | 233716 | 4/2006 |
| WO | 2004003693 A2 | 1/2004 |
| WO | 2015031802 A1 | 3/2015 |

OTHER PUBLICATIONS

Steven Martin Richman, Jason Clement, "Multiview TV Environment That is Curated by a Broadcaster or Service Provider", related U.S. Appl. No. 15/070,245, Final Office Action dated Aug. 21, 2017.

Steven Martin Richman, Jason Clement, "Multiview TV Environment That is Curated by a Broadcaster or Service Provider", related U.S. Appl. No. 15/070,245, Applicant's response to Final Office Action filed Sep. 12, 2017.

Steven Martin Richman, Jason Clement, Frederick J. Zustak, "Multiview as an Application for Physical Digital Media", related U.S. Appl. No. 15/070,447, Final Office Action dated Aug. 18, 2017.

Steven Martin Richman, Jason Clement, "Multiview TV Template Creation and Display Layout Modification", related U.S. Appl. No. 15/070,291, Applicant's response to Non-Final Office Action filed Aug. 18, 2017.

Steven Martin Richman, Jason Clement, "Multiview TV Environment That is Curated by a Broadcaster or Service Provider", related U.S. Appl. No. 15/070,245, Non-Final Office Action dated Jan. 22, 2018.

Steven Martin Richman, Jason Clement, "Multiview TV Environment That is Curated by a Broadcaster or Service Provider", related U.S. Appl. No. 15/070,245, Applicant's response to Non-Final Office Action filed Jan. 23, 2018.

Steven Martin Richman, Jason Clement, "High Resolution AVDD Ad Bar", related U.S. Appl. No. 15/070,334, Applicant's response to Final Office Action filed Nov. 17, 2016.

Activevideo, "Case Study: Liberty Puerto Rico Personalized mosaic for social TV navigation on existing STBs", published Mar. 31, 2015.

Amazon, "Design and User Experience Guidelines—Amazon Fire TV", https://developer.amazon.com/public/solutions/devices/tire-tv/docs/design-and-user-experience-guidelines, printed from website Apr. 7, 2016.

AT&T, "AT&T U-verse TV Customers Can Choose and Watch Their Favorite Channels Simultaneously with New Exclusive "My Multiview" App", Published Jun. 30, 2010.

DirecTV, "DirecTV Mix Channels", published Dec. 20, 2013.

Engadget, "Cablevision Lets Viewers Watch 9 Channels At Once With New iO TV", Published Mar. 24, 2011.

Han Hu, Jian Huang, He Zhao, Yonggang Wen, Chang Wen Chen, Tat-Seng Chua, "Social TV Analytics: A Novel Paradigm to Trans-

(56) References Cited

OTHER PUBLICATIONS form TV Watching Experience", Published Mar. 2014; https://www.researchgate.net/publication/261959898_Social_TV_analytics_A_novel_paradign_to_transform_TV_watching_experience.
Skreens Entertainment Technologies, "SkreensTV wants to turn your TV into a muti-screen content-streaming machine", https://pando.com/2014/11/13/skreenstv-wants-to-turn-your-tv-into-a-multi-screen-content-streaming-machine/, Published Nov. 13, 2014.
Steven Martin Richman, Jason Clement, "High Resolution AVDD Ad Bar", related pending U.S. Appl. No. 15/070,334, filed Mar. 15, 2016.
Steven Martin Richman, Jason Clement, "Multiview Display Layout and Current State Memory", related pending U.S. Appl. No. 15/070,169, filed Mar. 15, 2016.
Steven Martin Richman, Jason Clement, "Multiview TV Custom Display Creation by Aggregation of Provider Content Elements" related pending U.S. Appl. No. 15/070,206, filed Mar. 15, 2016.
Steven Martin Richman, Jason Clement, "Multiview TV Environment That Is Curated By a Broadcaster or Service Provider" related pending U.S. Appl. No. 15/070,245, filed Mar. 15, 2016.
Steven Martin Richman, Jason Clement, "Mutiview TV Template Creation and Display Layout Modification", related pending U.S. Appl. No. 15/070,291, filed Mar. 15, 2016.
Steven Martin Richman, Jason Clement, Frederick J. Zustak, "Multiview As An Application for Physical Digital Media", related pending U.S. Appl. No. 15/070,447, filed Mar. 15, 2016.
Steven Martin Richman, Jason Clement, Frederick J. Zustak, "Multiview as an Application for Physical Digital Media", related U.S. Appl. No. 15/070,447, Final Office Action dated Feb. 6, 2018.
Steven Martin Richman, Jason Clement, Frederick J. Zustak, "Multiview as an Application for Physical Digital Media", related U.S. Appl. No. 15/070,447, Applicant's response to Final Office Action filed Feb. 15, 2018.
Steven Martin Richman, Jason Clement, "Multiview TV Template Creation and Display Layout Modification", related U.S. Appl. No. 15/070,291, Final Office Action dated Feb. 8, 2018.
Steven Martin Richman, Jason Clement, "Multiview TV Template Creation and Display Layout Modification", related U.S. Appl. No. 15/070,291, Applicant's response to Final Office Action filed Feb. 14, 2018.
Steven Martin Richman, Jason Clement, "High Resolution AVDD Ad Bar", related U.S. Appl. No. 15/070,334, Final Office Action dated Apr. 28, 2017.
Steven Martin Richman, Jason Clement, "Multiview TV Environment That is Curated by a Broadcaster or Service Provider", related U.S. Appl. No. 15/070,245, Non-Final Office Action dated Dec. 1, 2017.
Steven Martin Richman, Jason Clement, "Multiview TV Custom Display Creation By Aggregation of Provider Content Elements", related U.S. Appl. No. 15/070,206, Final Office Action dated May 24, 2017.
Steven Martin Richman, Jason Clement, "Multiview TV Custom Display Creation By Aggregation of Provider Content Elements", related U.S. Appl. No. 15/070,206, Applicant's response to Final Office Action filed Jun. 12, 2017.
Steven Martin Richman, Jason Clement, "High Resolution AVDD AD Bar", related U.S. Appl. No. 15/070,334, Applicant's response to Final Office Action filed Jun. 9, 2017.
Steven Martin Richman, Jason Clement, "Multiview TV Custom Display Creation by Aggregation of Provider Content Elements", related U.S. Appl. No. 15/070,206, Applicant's response to Final Office Action filed Oct. 11, 2017.
Steven Martin Richman, Jason Clement, "Multiview TV Environment that is Curated by a Broadcaster or Service Provider", related U.S. Appl. No. 15/070,245, Final Office Action dated Mar. 13, 2018.
Steven Martin Richman, Jason Clement, "Multiview TV Custom Display Creation by Aggregation of Provider Content Elements", related U.S. Appl. No. 15/070,206, Non-Final Office Action dated Jul. 3, 2017.
Steven Martin Richman, Jason Clement, "Multiview TV Custom Display Creation by Aggregation of Provider Content Elements", related U.S. Appl. No. 15/070,206, Applicant's response to Non-Final Office Action filed Jul. 17, 2017.
Steven Martin Richman, Jason Clement, "Multiview TV Environment That is Curated By a Broadcaster or Service Provider", related U.S. Appl. No. 15/070,245, Non-Final Office Action dated Jul. 3, 2017.
Steven Martin Richman, Jason Clement, "Multiview TV Environment That is Curated By a Broadcaster or Service Provider", related U.S. Appl. No. 15/070,245, Applicant's response to Non-Final Office Action filed Jul. 17, 2017.
Steven Martin Richman, Jason Clement, "Multiview TV Template Creation and Display Layout Modification", related U.S. Appl. No. 15/070,291, Non-Final Office Action dated Jul. 14, 2017.
Steve Martin Richman, Jason Clement, "High Resolution AVDD Ad Bar", related U.S. Appl. No. 15/070,334, Applicant's response to Non-Final Office Action filed Jul. 13, 2017.
Steven Martin Richman, Jason Clement, Frederick J. Zustak, "Multiview as an Application for Physical Digital Media", related U.S. Appl. No. 15/070,447, Applicant's response to Non-Final Office Action filed Jul. 19, 2017.
Steven Martin Richman, Jason Clement, "High Resolution AVDD Ad Bar", related pending U.S. Appl. No. 15/070,334, non-final office action dated Dec. 9, 2016.
Steven Martin Richman, Jason Clement, "High Resolution AVDD Ad Bar", related pending U.S. Appl. No. 15/070,334, applicant's response to non-final office action filed Dec. 14, 2016.
Jinsoo Han, Intark Han, Kwang-Roh Park, "User Configurable Personalized Mosaic Electronic Program Guide", Published Feb. 2008.
Steven Martin Richman, Jason Clement, "Multiview TV Custom Display Creation by Aggregation of Provider Content Elements", related U.S. Appl. No. 15/070,206, Final Office Action dated Sep. 22, 2017.
Steven Martin Richman, Jason Clement, "Multiview TV Template Creation and Display Layout Modification", related U.S. Appl. No. 15/070,291, Non-Final Office Action dated Nov. 22, 2017.
Steven Martin Richman, Jason Clement, "Multiview TV Template Creation and Display Layout Modification", related U.S. Appl. No. 15/070,291, Applicant's response to Non-Final Office Action filed Nov. 28, 2017.
Steven Martin Richman, Jason Clement, "High Resolution AVDD Ad Bar", related U.S. Appl. No. 15/070,334, Non-Final Office Action dated Oct. 12, 2016.
Steven Martin Richman, Jason Clement, "High Resolution AVDD Ad Bar", related U.S. Appl. No. 15/070,334, Applicant's response to Non-Final Office Action filed Oct. 13, 2016.
Steven Martin Richman, Jason Clement, "Multiview TV Custom Display Creation by Aggregation of Provider Content Elements", related pending U.S. Appl. No. 15/070,206, non-final office action dated Apr. 4, 2017.
Steven Martin Richman, Jason Clement, "Multiview TV Custom Display Creation by Aggregation of Provider Content Elements", related pending U.S. Appl. No. 15/070,206, applicant's response to non-final office action filed Apr. 5, 2017.
Steven Martin Richman, Jason Clement, "High Resolution AVDD AD Bar", related U.S. Appl. No. 15/070,334, Non-Final Office Action dated Jun. 30, 2017.
Steven Martin Richman, Jason Clement, Frederick J. Zustak, "Multiview as an Application for Physical Digital Media", related U.S. Appl. No. 15/070,447, Non-Final Office Action dated Jun. 30, 2017.
Steven Martin Richman, Jason Clement, Frederick J. Zustak, "Multiview as an Application for Physical Digital Media", related U.S. Appl. No. 15/070,447, Non-Final Office Action dated Nov. 3, 2017.
Steven Martin Richman, Jason Clement, Frederick J. Zustak, "Multiview as an Application for Physical Digital Media", related U.S. Appl. No. 15/070,447, Applicant's response to Non-Final Office Action filed Nov. 7, 2017.
Steven Martin Richman, Jason Clement, "High Resolution AVDD AD Bar", related U.S. Appl. No. 15/070,334, Final Office Action dated Nov. 8, 2017.

(56) References Cited

OTHER PUBLICATIONS

Steven Martin Richman, Jason Clement, "High Resolution AVDD Ad Bar", related U.S. Appl. No. 15/071,334, Final Office Action dated Nov. 14, 2016.

Steven Martin Richman, Jason Clement, "Multiview TV Environment that is Curated by a Broadcaster or Service Provider", related U.S. Appl. No. 15/070,245, Applicant's response to Final Office Action filed Mar. 16, 2018.

Steven Martin Richman, Jason Clement, "Multiview TV Environment That is Curated by a Broadcaster or Service Provider", related U.S. Appl. No. 15/077,245, Applicant's response to Non-Final Office Action filed Dec. 8, 2017.

Steven Martin Richman, Jason Clement, "Multiview Display Layout and Current State Memory", related U.S. Appl. No. 15/070,169, Non-Final Office Action dated Apr. 5, 2018.

Steven Martin Richman, Jason Clement, "Multiview Display Layout and Current State Memory", related U.S. Appl. No. 15/070,169, Applicant's response to Non-Final Office Action filed Apr. 13, 2018.

Steven Martin Richman, Jason Clement, Frederick J. Zustak, "Multiview as an Application for Physical Digital Media", related U.S. Appl. No. 15/070,447, Non-Final Office Action dated Apr. 4, 2018.

Steven Martin Richman, Jason Clement, Frederick J. Zustak, "Multiview as an Application for Physical Digital Media", related U.S. Appl. No. 15/070,447, Applicant's response to Non-Final Office Action filed Apr. 13, 2018.

Steven Martin Richman, Jason Clement, "Multiview TV Environment that is Curated by a Broadcaster or Service Provider", related U.S. Appl. No. 15/070,245, Non-Final Office Action dated May 10, 2018.

Steven Martin Richman, Jason Clement, "Multiview TV Environment that is Curated by a Broadcaster or Service Provider", related U.S. Appl. No. 15/070,245, Applicant's response to Non-Final Office Action filed May 22, 2018.

Steven Martin Richman, Jason Clement, "Multiview Display Layout and Current State Memory", related U.S. Appl. No. 15/070,169, Final Office Action dated Jul. 26, 2018.

Steven Martin Richman, Jason Clement, "Multiview TV Environment That is Curated By a Broadcaster or Service Provider", related U.S. Appl. No. 15/070,245, Final Office Action dated Jun. 25, 2018.

Steven Martin Richman, Jason Clement, Frederick J. Zustak, "Multiview as an Application for Physical Digital Media", related U.S. Appl. No. 15/070,447, Final Office Action dated Jun. 11, 2018.

Steven Martin Richman, Jason Clement, Frederick J. Zustak, "Multiview as an Application for Physical Digital Media", related U.S. Appl. No. 15/070,447, Applicant's response to Final Office Action filed Jun. 19, 2018.

Steven Martin Richman, Jason Clement, "Multiview Display Layout and Current State Memory", related U.S. Appl. No. 15/070,169, Applicant's response to Final Office Action filed Aug. 6, 2018.

Steven Martin Richman, Jason Clement, Frederick J. Zustak, "Multiview as an Application for Physical Digital Media", related U.S. Appl. No. 15/070,447, Non-Final Office Action dated Aug. 23, 2018.

Steven Martin Richman, Jason Clement, Frederick J. Zustak, "Multiview as an Application for Physical Digital Media", related U.S. Appl. No. 15/070,447, Applicant's response to Non-Final Office Action filed Sep. 4, 2018.

Steven Martin Richman, Jason Clement, "Multiview Display Layout and Current State Memory", related U.S. Appl. No. 15/070,169, Non-Final Office Action dated Oct. 2, 2018.

Steven Martin Richman, Jason Clement, "Multiview Display Layout and Current State Memory", related U.S. Appl. No. 15/070,169, Applicant's response to Non-Final Office Action filed Oct. 3, 2018.

Steven Martin Richman, Jason Clement, Frederick J. Zustak, "Multiview as an Application for Physical Digital Media", related U.S. Appl. No. 15/070,447, Final Office Action dated Nov. 8, 2018.

Steven Martin Richman, Jason Clement, Frederick J. Zustak, "Multiview as an Application for Physical Digital Media", related U.S. Appl. No. 15/070,447, Applicant's response to Final Office Action filed Dec. 26, 2018.

Steven Martin Richman, Jason Clement, "Multiview Display Layout and Current State Memory", related U.S. Appl. No. 15/070,169, Final Office Action dated Dec. 27, 2018.

Steven Martin Richman, Jason Clement, "Multiview Display Layout and Current State Memory", Applicant's response to Final Office Action filed Feb. 11, 2019.

* cited by examiner

CONTENT SURFING, PREVIEW AND SELECTION BY SEQUENTIALLY CONNECTING TILED CONTENT CHANNELS

FIELD

The application relates generally to multiview presentations on high definition (HD)/ultra high definition (UHD) video displays.

BACKGROUND

HD and UHD displays such as 4K and 8K displays (and higher resolutions envisioned) offer large display "real estate" of remarkable resolution.

SUMMARY

Accordingly, a device includes at least one computer memory that is not a transitory signal and that in turn includes instructions executable by at least one processor to present on a display a user interface (UI) comprising plural tiles each being associated with a respective content. The instructions are executable for, responsive to a screen focus on a first tile of the UI, playing video in the first tile and presenting only still images in tiles of the UI other than the first tile.

In examples, the instructions may be executable to scroll tiles on and off the display in a carousel format responsive to a user-input scroll command. If desired, second tiles in the UI can represent respective TV channels, and third tiles in the UI can represent one or more of: software applications, web pages, graphical data feeds. A tile can become in focus by virtue of the user-input scroll command rotating the carousel until the first tile is in a central portion of a tiled view of the UI.

In some embodiments, the may UI include two horizontally-arranged carousels of tiles. A first carousel can have tiles representing underlying assets from local or cloud-based storage, and a second carousel can have tiles representing underlying TV channels. The first carousel can be rotated independently of the second carousel.

In example implementations, the UI may include a video carousel of tiles each representing a respective video. The tiles of the video carousel can be stacked vertically, with a top tile being completely shown and tiles underlying the top tile shown only at edges of the tiles underlying the top tile. The top tile is in focus.

In another aspect, a method for establishing a carousel of tiles for a user interface (UI) presentable on a display includes resenting a column of tiles on the display. The method also includes resenting an assignment list next to the tiles, and receiving user association signals associating a tile with a content source type in the list to thereby associate the tile with a carousel of tiles associated with the content source type.

In another aspect, an apparatus includes a display, a processor, and a computer memory with instructions executable by the processor to present a carousel of tiles in a user interface (UI) on the display. The UI has a current video presented adjacent the carousel, and the carousel is presented as if the tiles were arranged on a disk, such that a center-most tile appears larger than tiles in the carousel other than the center-most tile, which become progressively smaller from the center-most tile outward. The center-most tile is in focus and hence a video can be played in the center-most tile.

The details of the present disclosure, both as to its structure and operation, can be best understood in reference to the accompanying drawings, in which like reference numerals refer to like parts, and in which:

DETAILED DESCRIPTION

Figure 1:
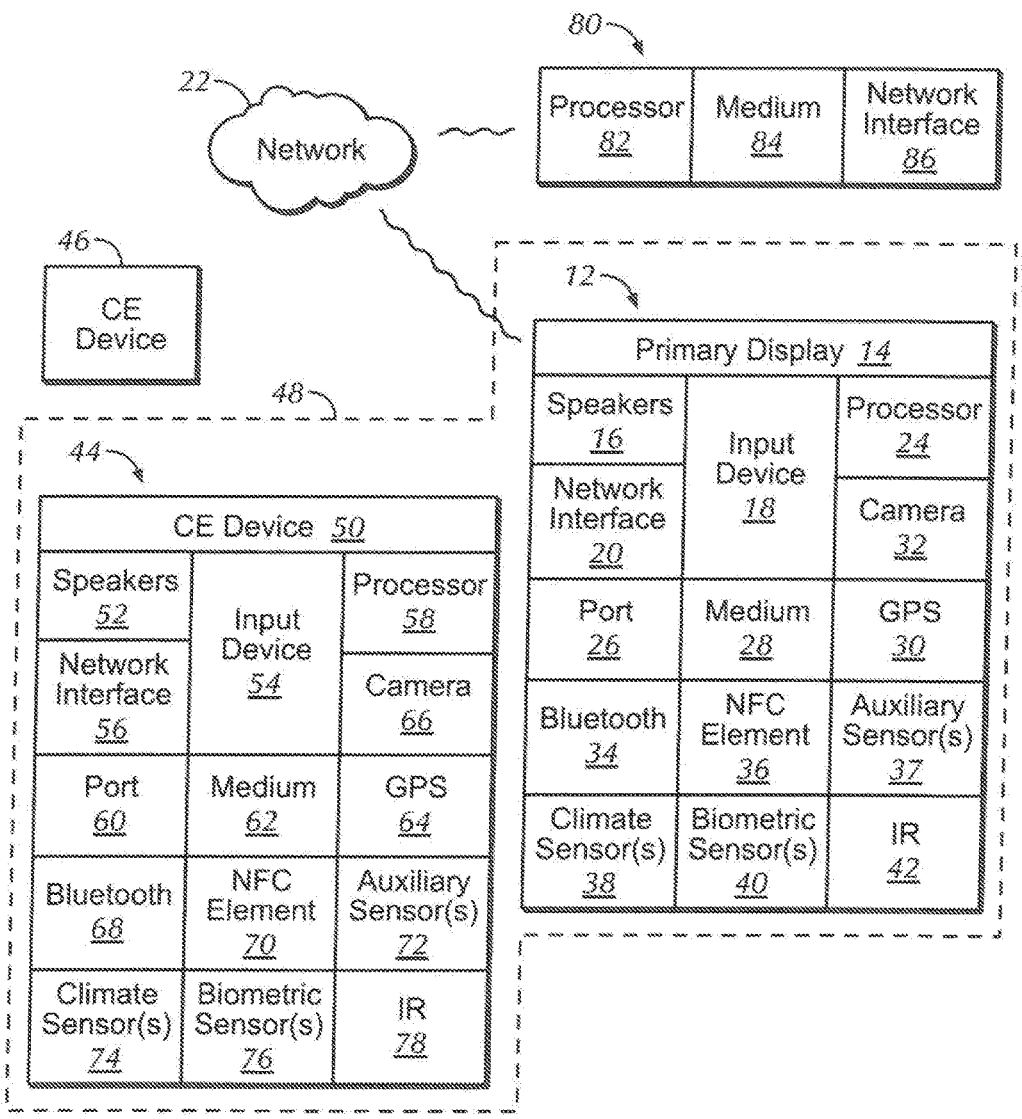
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. catering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same mom as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone.

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
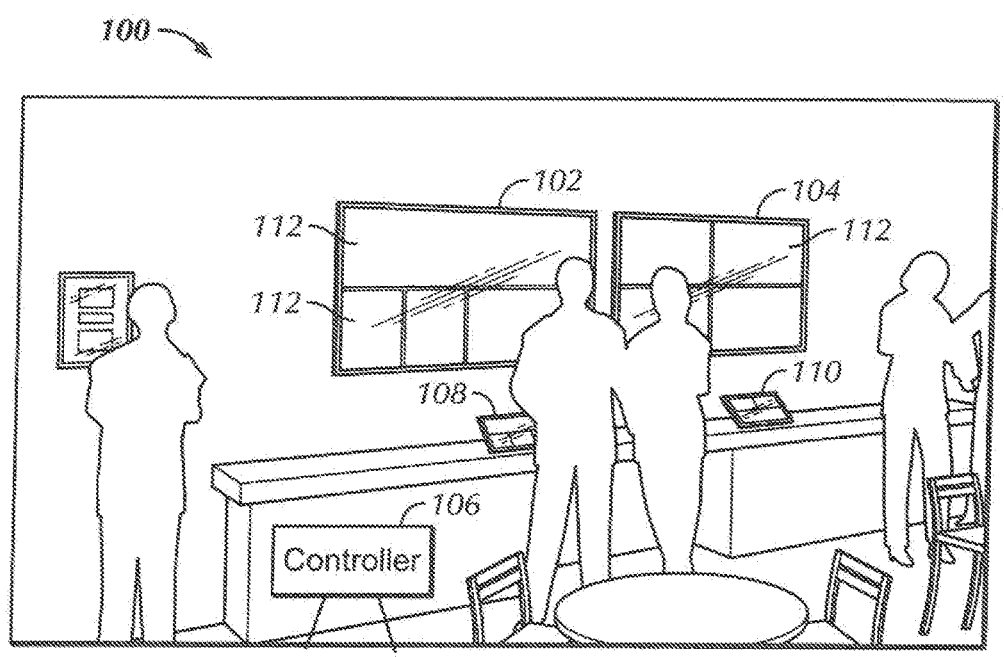
FIG. 2 is a partially schematic view of a specific example system with two UHD displays mounted on a wall side by side.

FIG. 2 shows an example system 100 in which one or more ultra high definition (UHD) displays 102, 104 are mounted on a wall, e.g., a wall of a home or a luxury stadium box. The UHD displays 102, 104 may be 4K displays. One or more control devices control presentation of the displays by sending commands wirelessly and/or over wired paths to one or more controllers. In the non-limiting example shown, a controller 106 controls the displays 102, 104, it being understood that a separate controller may be provided for each display. In the non-limiting example shown, content control on the first display 102 is established by a first control device 108 while content control on the second display 104 is established by a second control device 110, it being understood that a single control device may be used to establish control on both displays.

The control devices 108, 110 may be, without limitation, portable computers such as tablet computers or laptop computers (also including notebook computers) or other devices with one or more of the CE device 44 components shown in FIG. 1. The displays 102, 104 may be monitors only and/or may include one or more of the primary display 14 components shown in FIG. 1. The controller 106 may be a personal computer (PC) or game console or server that contains one or more of the components variously shown in FIG. 1. In the non-limiting example shown, the control devices 108, 110 communicate directly with the controller 106 using, e.g., WiFi or Bluetooth; the control devices 108, 110 do not communicate directly with the displays 102, 104.

Instead, the controller 106 communicates with the displays 102, 104 to establish presentation thereon in accordance with commands received from the control devices. It is to be understood that while the controller 106 is shown physically separate from the displays in FIG. 2, it may be incorporated within the chassis of a display. As also shown, the displays may present plural contents in respective content windows 112.

The following description inherits the principles and components of the preceding discussion.

Now referring to FIG. 3, a display device 300 which, like the display devices presenting screen shots described below, may be implemented by the AVDD 12 of FIG. 1, presents multiple thumbnails, also referred to herein as "tiles" 302, each of which represents an underlying video asset. Each tile 302 may be a still shot derived from a frame or frames of the underlying video asset. Note that while the shape of the tiles shown is rectangular, other shapes may be used. For example, tiles may be triangular, circular, oval, or hexagonal, and mixtures of tile shapes may be used.

As will be explained in greater detail below, the Multiview techniques herein allow the consumer (also referred to as "customer" or "viewer" or "user") control the "real estate" on the larger screen high resolution display. Unlike UIs that have tiles as part of a UI menu system controlled mostly by the TV or operating system, embodiments herein enable a "video wall" such that the applications or video tiles or widgets or services are displayed and shuttled around the real estate as the consumer wishes, or automatically organized based on sorting algorithms.

The digital signage aspect of Multiview is one where the retailer or advertiser can deliver "objects" to the screen and each object can be independently controlled. The object-based video, or independently run application, or notification popup bar or scrolling marquee are all ways to deliver an impact to the consumer walking by. Accordingly, flexibility is provided among these screen objects to self-adjust as new information is presented. They can also be selected for expansion to the entire screen should a consumer want full display.

Control can come from the consumer, the broadcaster/programmer or the advertiser. An advertising server may be running in the background feeding the display and as new ads present themselves, or new merchandise displayed, the real estate dynamically adjusts.

Templates, described further below, are one way of having a fixed organization of tiles made up of applications or objects. Each tile can be an object that can be independently controlled and programmed. In some embodiments the template view has divisions that can be independently controlled, and is created as a Template for the purpose of maximal use of the screen real estate. Templated views can be themed such as Sports or Cooking or Movie Templates that allow for auto content display based on a histogram of the consumers viewing selections over time.

Multiview can be made up of individual IP video feeds or just one monolithic IP feed with each decimated video aggregated into one template. In example implementations, the template knows how the videos and objects and applications (tiles) making up the entire template have been arranged so that the user can signal the broadcaster what video to remove or add in an interactive IP video session. In a televised broadcast template, the national feeds can be selected and set based on the supporting templates, whereas in an IP video streaming session the tiles that make up a single IP feed can be controlled by the consumer and broadcaster to satisfy the targeted viewing preferences of a single household or viewer.

Display real estate thus may be segmented into tiles or objects each of which is assigned metadata of the full view. Upon selecting options for each tile, a greater range of metadata and options are available for each tile. Metadata options can be in the form of selectable applications, selectable views, or selectable carrousels of content as discussed further below. Each tile may be individually managed and controlled and easily reset with updated content in a variety of ways.

As focused is placed on a particular tile by highlighting it or surrounding it with a lighted bar, metadata searches can be delivered also into other tiles for the purpose of linking. Linking allows a consumer to highlight a video and then have the supporting metadata displayed in a tile next to the video. Tile linking is a way to search for further information about content delivered in one tile, and then display it in another adjacent tile for the purpose of managing the real estate and allowing for continued live updates from the video to be displayed in the adjacent tile during the viewing. This type of linking allows for one type of object to be separated but linked to another type of object, e.g., a video linked to a metadata concurrent display. Automatic linking can occur when an operator delivers a single template and each tile has a relationship to each other for the purposes of curating the entire video experience.

Figure 3:
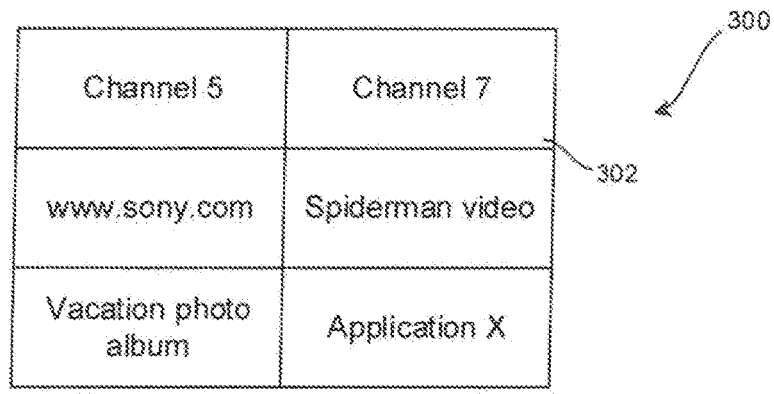
FIG. 3 is a screen shot of an example display presentation consistent with present principles.

In the example shown, the tiles 302 in the top row of the screen shot of FIG. 3 represent broadcast TV channels. The tiles 302 in the middle row of the screen shot of FIG. 3 respectively from left to right represent a web video and video stored locally to the device 300 on, e.g., a DVR or optical disk or stored in the cloud and linked to the device 300. The tiles 302 in the bottom row of the screen shot of FIG. 3 represent respectively from left to right a photograph album stored locally or on cloud storage, and a software application such as, for example, a computer game application.

Figure 4:
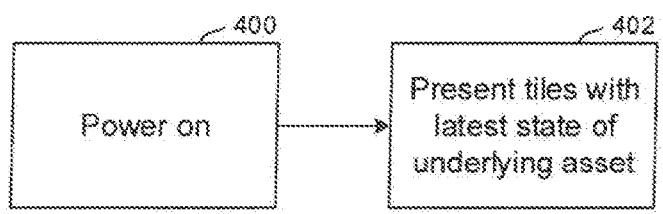
FIG. 4 is a flow chart of example logic consistent with present principles.

Some of the tiles 302 are established by a consumer designating the underlying asset as a "favorite", and hence the screen shot of tiles in FIG. 3 represents a favorites list. As shown in FIG. 4, however, at power-on 400 of the device 300, both the images presented on the tiles 302 and the underlying video content revert at block 402 to the latest state the underlying respective content was in when last viewed on the device 300. The consumer thus does not have to reset the state of the content when selecting it via selecting the corresponding tile 302 and locate the part of the video asset the consumer was in at the time the video asset was previously stopped, paused, navigated away from, or otherwise discontinued by, e.g., power-off of the device 300, changing channels on the device 300, etc.

Thus, as represented in FIGS. 3 and 4, a multiview tile-based state of TV channels, web videos, applications, graphics, pictures and webpages can be presented on a single display screen such that the state of the collection of tiles and views can be stored by the display and returned to instantly when the consumer turns the display back on.

Figure 5:
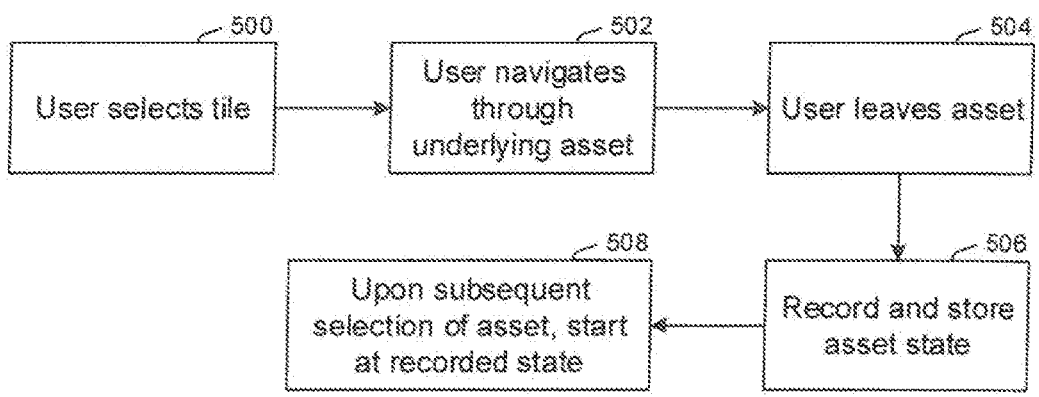
FIG. 5 is a flow chart of example logic consistent with present principles.

As indicated in FIG. 5, each state may be remembered automatically and by selection of a state profile name to be stored and referenced. The display may present tiles representing favorite TV channels, web feeds, channel guide, etc. and aggregate the tiles into a single view. The consumer can tab through each tile or application view or web view. The consumer can tab through the individual tiles and select a tile at block 500 to cause an asset underlying a selected tile to be presented full screen or within the tile. The consumer navigates (plays) through the asset at block 502, discontinuing viewing of the asset at block 504. At block 506 the device 300 in response to the act of discontinuance records the location of the content the consumer was in at discontinuance. When the consumer subsequently returns to the assets by, e.g., once again selecting, at block 508, the corresponding tile from the presentation in FIG. 3, the recorded state information at discontinuance is retrieved and the asset is resumed from the point of discontinuity.

In an example, the state of a video asset is automatically recorded when viewing of the video is discontinued. The information recorded may include the identification of the device 300 such as a network address thereof as well as the location in the video stream that was last presented on the device 300. Various techniques can be used to know the last-viewed location, including, for example, knowing the location in a video bitstream at which viewing of the video was discontinued using Remote Viewing (RVU) technology. Or, the length of time the video was viewed and recorded. Yet again, automatic content recognition (ACR) can be used on a snapshot of the last-viewed frame and used as entering argument to a database of video to identify the location in the video at which viewing was discontinued.

Thus, favorite assets are managed in a way that allows the consumer to scroll through a stream of tiles to see what the favorites are in real time as the display is viewed. Much like a carousel, the viewer can retain the "state" of the individual content source within each tile so that upon subsequent re-selection, it returns back to exactly where the consumer left off. Instead of showing the content from the beginning, or updated webpage, the strip or carousel takes the last snapshot of the asset state and displays it for reference.

In an example, the display executes a hypertext markup language (HTML)-5 application to store the content state of each tiled asset as an extensible markup language (XML) file that has the commands and state information ready to be accessed.

Remembering the exact state of content being viewed and the ability to go right to that point of viewing enables a consumer to move from device to device and maintain the exact viewing configuration that was in effect when one device was abandoned and another one accessed.

Figure 6:
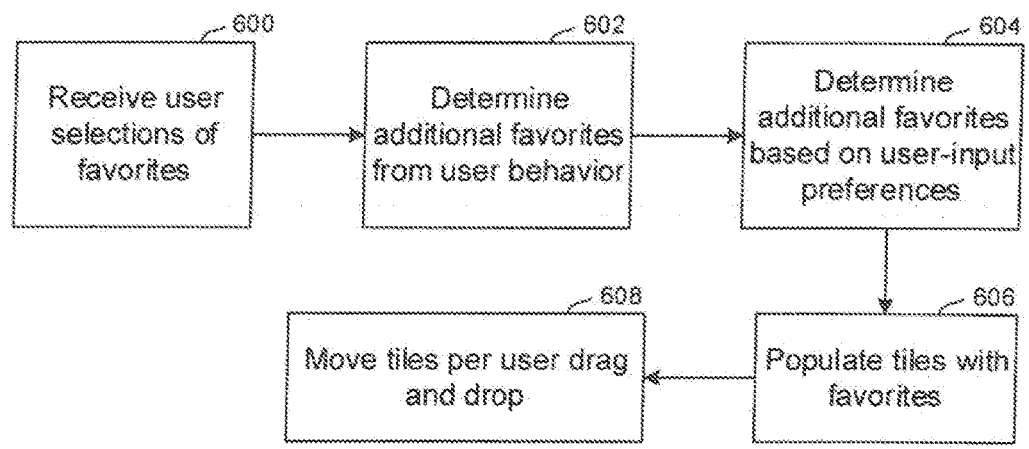
FIG. 6 is a flow chart of example logic consistent with present principles.
Figure 7:
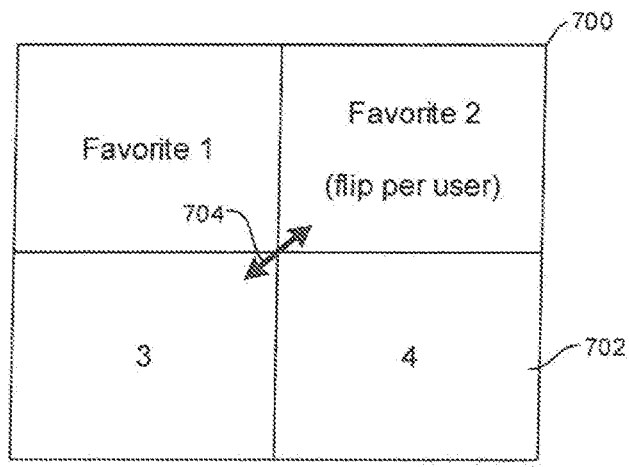
FIG. 7 is a screen shot of an example display presentation consistent with present principles.
Figure 8:
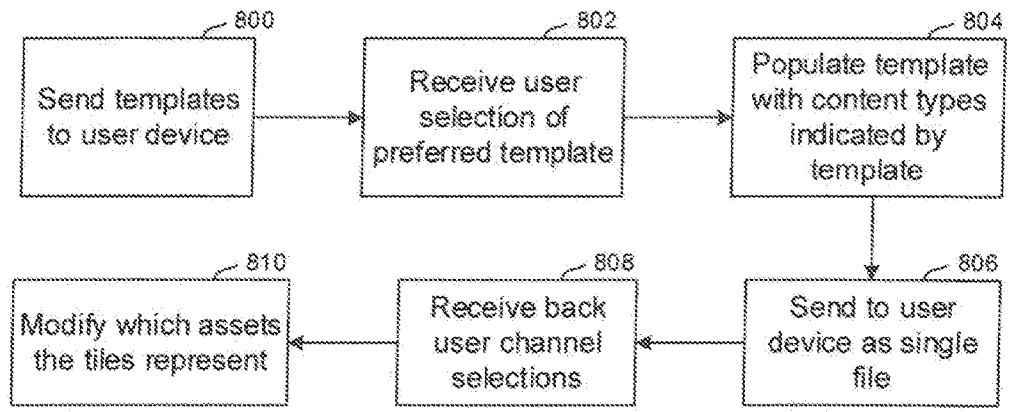
FIG. 8 is a flow chart of example logic consistent with present principles.

Turning now to FIGS. 6 and 7, a technique for Multiview TV Custom Display Creation by Aggregation of Provider Content Elements is shown. The technique of FIG. 6 enables the creation of a customized mosaic of content shown in FIG. 7, based upon the consumer's selection or tagging of favorites when inside an application, webpage, broadcast channel, TV program guide, or other sources of content. Moreover, the consumer does not have to manually tag each element, since the device 700 shown in FIG. 7 and executing some or all of the logic of FIG. 6 can understand preferences chosen by the consumer and make recommendations for content for each individual tile that is chosen for display using, e.g., algorithms for predicting content the consumer might like such as employed by ROV and other machine learning algorithms. For instance, ACR can be used to match images from viewed favorites to images in a video database from other video assets.

At block 600, the device 700 of FIG. 78 receives consumer selections of favorites. This may be done by allowing to access a "favorite" drop-down tag while viewing a video and select it, in which case the device 700 captures the identification of the asset being viewed and adds it to a data structure of consumer favorites. Or, the consumer may be presented with a list of video assets and prompted to select the assets he or she wishes to designate a favorite. Other techniques for allowing a consumer to identify a favorite may be used.

Moving to block 602, the device 700 automatically determines additional potential favorites based on consumer behavior in operating the device 700. For example, any of the techniques mentioned previously may be used. Also, as another example, if the consumer watches sports channels for an unusually long period of time, the identifications of other sports channels or video sources may be automatically added to the favorites data structure.

In addition, at block 604 additional identifications of other potential favorite video assets may be added to the favorites data structure based on consumer-input preferences. For example, a user interface (UI) can be presented on the device 700 prompting the consumer to enter preferred actors, or video genres, etc. and those preferences are then used as entering arguments to a database of video metadata to retrieve the identifications of video assets most closely satisfying the consumer-input preferences.

The tiles 702 in FIG. 7 are then populated at block 606 with still images from the favorites (e.g., top "N" favorites in the list, when more favorites appear in the list than can be accommodated by the tile layout) or with video from the favorites. In the latter case, the video may be decimated at the broadcaster or other source to conserve processing by the device 700. Note that as used herein, "decimation" is not to be given its literal meaning of removing every tenth pixel or portion of video, but is to be interpreted to mean "reduce" the video by removing an appropriate number of pixels or portion of video.

However, if desired the decimation of the video may be executed by the device 700 on undecimated full video received from the sources of the favorites. When decimated by the broadcaster or other source, the device 700 can transmit a message to the broadcaster or other source that the favorites UI of FIG. 7 has been selected by the consumer for view, in response to which the broadcaster or other source decimates the video prior to sending it to the device 700.

At block 608, the consumer may, with the aid of a point and click device or other input means (e.g., touch screen input), drag and drop or otherwise move the tiles 702 in the presentation of the UI of FIG. 7, as indicated by the arrow 704.

Accordingly, each tile 702 in the mosaic of tiles of FIG. 7 can be automatically populated with favorite content based upon the preferences outlined by the consumer. And automatic content selection can be also chosen by a smart algorithm that the device 700 uses based on previous viewing habits (e.g., ACR technology). However, the consumer may also select content and the associated URL or channel delivered to one particular segment of the screen. Once a particular source of content is chosen for display, each separate mosaic tile 702 can be independently controlled for sound, and content can be moved around the main screen to different tiles or segments. The ability of the device 700 to generate a list of preferred sources of content from what has been watched and use that content to auto populate customized mosaics created by the consumer helps the viewer by filtering out what is most watchable. Moreover, in some implementations the device 700, using, e.g., ACR technology data, knows that the consumer likes to watch certain channels at certain times of day, and then can tabulate this data to recommend time of day content streams for each type of template the consumer has created or chosen.

Diverse content sources are thus aggregated into a single view on a display device and the UI may be at least partially auto populated with these selected content sources. Selecting content from various Internet sources, cable sources, HDMI sources can be then aggregated into a customized display.

Templates such as the example shown in FIG. 700 can be built into the firmware or operating system of the device 700 for speed. However, HTML5 based applications also can be run by the processor of the device 700 to execute present principles.

As further contemplated herein, the device 700 may be employed according to above principles in hospitality establishments or bars or for digital signage as a way to deliver product videos that show how the product is being used or fashion video demonstrations of clothing, etc. Moreover, medical uses with different camera angles of an operation populating the tiles 702 are envisioned. The videos can be related to each other.

Turning now to FIGS. 8-12, techniques for a Multiview TV Environment that is Curated by a Broadcaster or Service Provider are exemplified. Beginning at block 800, plural templates are sent by a video service provider such as a TV broadcaster, e.g., a multiple system operator (MSO), to a user device such as any of the devices herein. The templates generally illustrate respective tile layouts, including numbers and sizes of tiles, and content type for the template, e.g., "movie template" or "sports template".

A consumer selection of a desired layout is received from the user device at block 802. The consumer selection is sent in the form of metadata to the service provider, including the name or network address of a desired channel, web feed, etc. A consumer need only click on a selection as described further below, and the AVDD automatically extracts the relevant metadata from the selected asset and sends it to the service provider.

At block 804 the service provider populates the template with content types indicated by the template. Thus, each tile of the template is associated with an underlying content of the template type. Each tile may be visually represented by a still or video image selected from the underlying asset. The consumer may also indicate specific content sources, e.g., specific sports TV channels or web feeds for a "sports" template, and those selected sources are used to populate the template.

Moving to block 806, the service provider sends the populated template to the user device as a single file or feed. The consumer may employ a point and click device such as a TV remote control to select a tile on the template, which is received at block 808. At block 810, the underlying asset represented by one or more respective tiles may be changed such that the tile is associated with a first asset at a first time and a second asset at a second time.

Thus, when the tiles are implemented by respective video feeds (which may be decimated by the service provider or the receiving AVDD as described previously), the consumer can watch multiple video events simultaneously as a single feed provided by the broadcaster or other service provider. The consumer selects optional display templates offered by the service provider for automatic content arrangement and display in an organized curated manner. The content is delivered by the broadcaster or other service provider and fills in the template that is chosen by the consumer. For a Multiview TV experience, the feeds can be Internet Protocol (IP) feeds and can be selected by the content distributor or the end customer as mentioned above. Each template identifies the type of content that is delivered into each portion or tile.

Figures 9, 10:
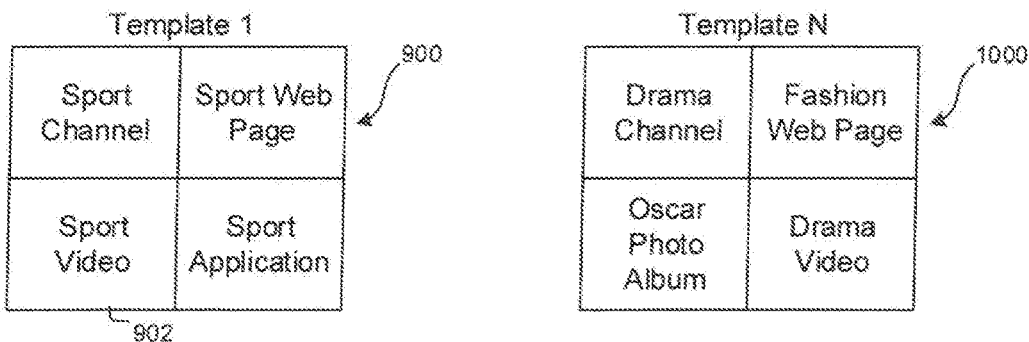
FIG. 9 is a screen shot of an example display presentation consistent with present principles.
FIG. 10 is a screen shot of an example display presentation consistent with present principles.

For example, the service provider can create a customized sports view 900 as shown in FIG. 9 for the Olympics that allows individual broadcast streams (Olympic events) to be aggregated by the broadcaster and displayed as a single broadcast stream on the AVDD 902. Also, a customized drama/movie template 1000 (FIG. 10) may be provided.

Figure 11:
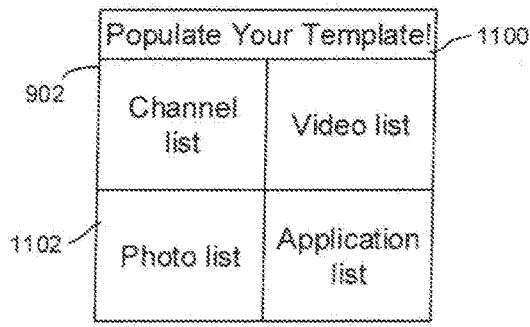
FIG. 11 is a screen shot of an example display presentation consistent with present principles.

As shown in FIG. 11 and discussed above in relation to FIG. 8, a prompt 1100 may be presented on the AVDD 902 for the consumer to populate the template. The consumer may be provided with plural list panes 1102 presenting lists of content from respective source types. Thus, as shown in FIG. 11, one pane 1102 may present a channel list, from which the consumer can select one or more TV channels to populate a template. Likewise, lists for other source types including locally sourced or cloud-sourced videos, software applications, and photographs, as but a few examples, may be provided.

Figure 12:
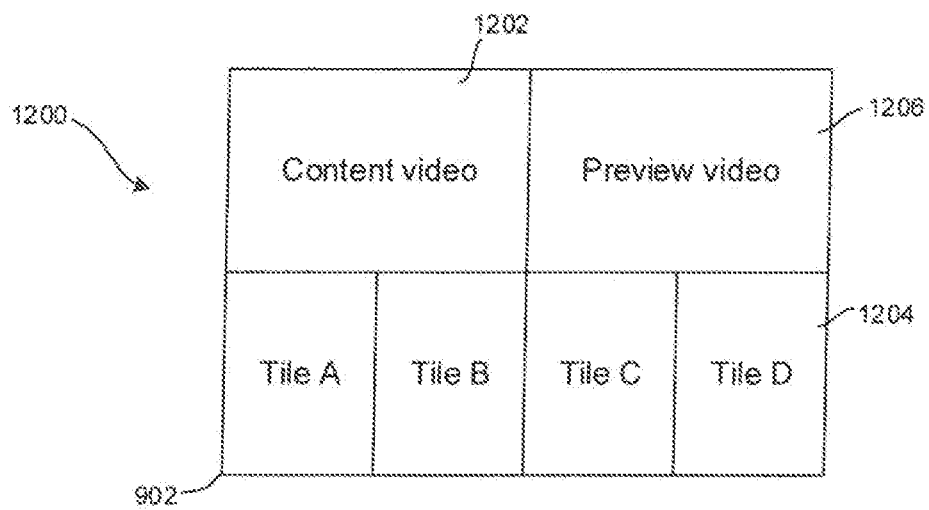
FIG. 12 is a screen shot of an example display presentation consistent with present principles.

FIG. 12 shows an alternate tiled layout 1200 in which a currently tuned-to content is shown in a relatively large content pane 1202, and content selected for preview such as by receiving selection of a relatively smaller tile 1204 in a row of tiles may be presented in a relatively larger preview pane 1206. Selection of the preview pane 1206 can cause the preview content to move into the content pane 1202.

Figure 12A:
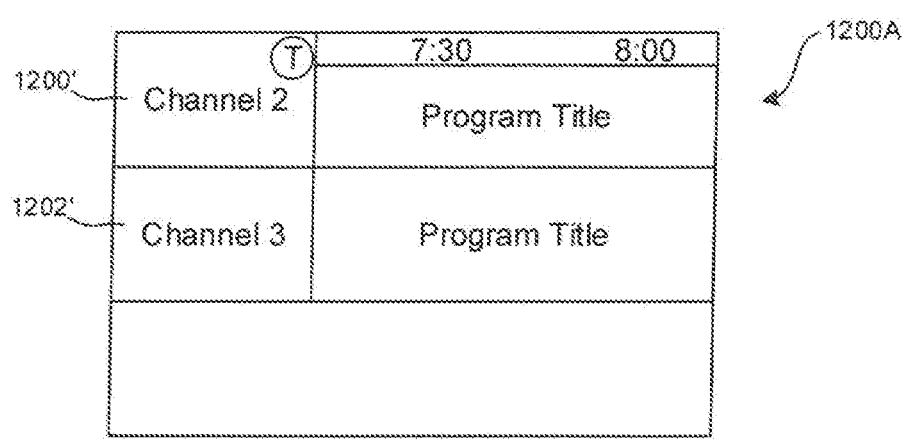
FIG. 12A shows an example electronic program guide (EPG)

Each channel that populates a template for viewing in multicast format can be associated with an indicator in the program guide sent as metadata to the AVDD. For instance, as shown in FIG. 12A, an indicator such as an icon or letter "T" may appear on an EPG 1200A next to each channel 1200' that is also available for viewing on the template along with the other videos or channels that populate the template, whereas no such indicator is listed for channels 1202' that are not available in multicast. The consumer can also indicate the channels to be watched to the service provider and then have a single stream be delivered to the TV by the service provider of different broadcast channels, such as multiple sports broadcasts. The consumer informs the Broadcaster or Service Provider what they want to watch by selecting from a list or by individually selecting channels, which can then be formatted as XML files and sent back to the content aggregator (typically, the service provider). The single stream is displayed using this custom template with audio capable of being selected for each video element. Multiple audio streams can also be delivered and streamed to wireless headphones. An audio channel can be individually selected for each video stream and listened to collectively or privately. The content is synchronized or curated by the broadcaster or other service provider based on consumer defined preferences or selected and each state can remembered or saved for future reference or display.

The effective use of larger screen AVDDs with improved display resolution allows for splitting the canvas into multiple parts that can be delivered as a single video feed or HTML 5 application. Each broadcaster or content source or service provider can leverage this system for delivering a package of content not just one video or one guide or one website.

It may now be appreciated that in the example of FIGS. 8-12, the content which is shown in a Multiview template is defined (selected) by the consumer by sending metadata to the broadcaster or service provider which then packages the content appropriately to the consumer's tastes as reflected in the selections. This creates an interactive component of customized screen views.

Using Web standards and HTML applications, the service provider can deliver these custom templates, as long as the hardware platform supports the multiple decoding requirements of the video. The purpose of this application or template is to signal to the content source or service provider how the consumer wants the video to be delivered.

Attention is now directed to FIGS. 13-18, which illustrate AVDD Content Surfing, Preview and Selection by Sequentially Connecting Tiled Content Channels. As will be shortly described in greater detail, TV video or any TV displayable content may be presented in respective tiles on a high resolution display, such as 4K or 8K, arranged in a vertical or horizontal manner that uses sequentially placed content tiles or content blocks. A consumer can scroll the tiles using a point and click device such as a TV remote control. Each tiled piece of content can be scrolled such that the consumer can quickly identify watchable content and select content by clicking on the respective tile to cause the content to be expanded full screen on the VADD.

Figure 13:
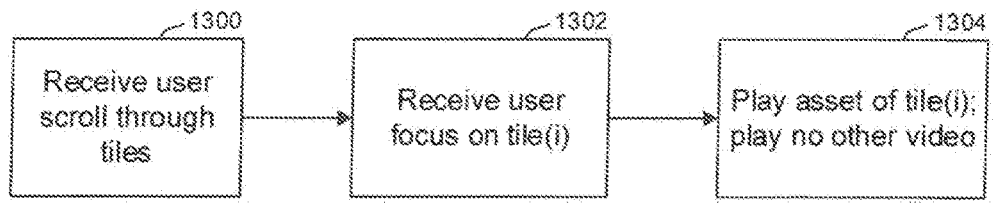
FIG. 13 is a flow chart of example logic consistent with present principles.

Commencing at block 1300 in FIG. 13, the tiles, which may be stacked vertically or distributed horizontally or otherwise in a sequence of tiles, can be scrolled through by the customer. The tiles may be arranged in storage in a circular queue, also referred to herein as a "carousel". Each tile can represent an underlying TV channel, software application, web page, picture, or graphical data feed that can be reviewed and selected independently of the other tiles.

As the consumer scrolls through the tiles, one of the tiles moves into focus at block 1302, typically into the central portion of the tiled view. As a tile takes focus as shown at 1400 in FIG. 14, at block 1304 video from the underlying is played within the tile, and the associated audio becomes dominant. No other tiles 1402 need present video, only still images derived from their respective underlying assets, to conserve processing resources. The automatic aspect of focus on the tile allows each tile to become live when the focus of the consumer is on that particular tile. Until the tile is focused on it is static, displaying cover art or images but not playing video or turning live.

Figure 14:
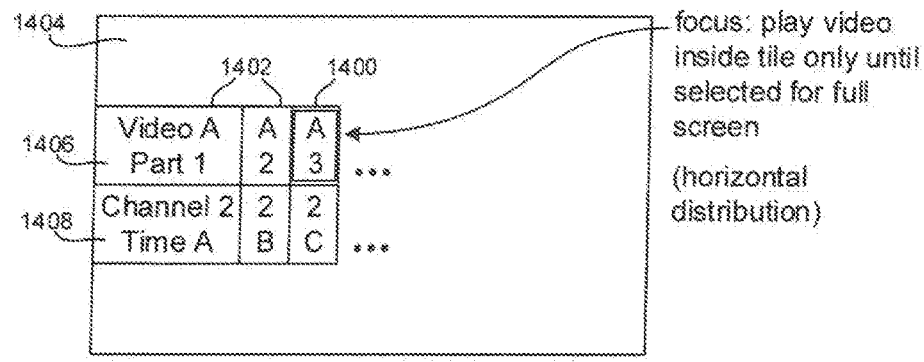
FIG. 14 is a screen shot of an example display presentation consistent with present principles.

As shown in, e.g., FIG. 14, the tiles 1402 are also much smaller in aspect ratio than the entire main display screen 1404, such that several tiles are viewed simultaneously, but only one becomes dominant at time. Each content tile or block that is showing a static image still describes its content well enough to know what is behind it, but only when the tile comes into focus (as at 1400) is the underlying video played back.

FIG. 14 shows two horizontally-arranged carousels, a first carousel 1406 having tiles representing underlying assets from local or cloud-based storage, and a second carousel 1408 having tiles representing underlying TV channels. Each carousel 1406, 1408 can be independently "rotated" from the other by scrolling through the carousel.

Figure 15:
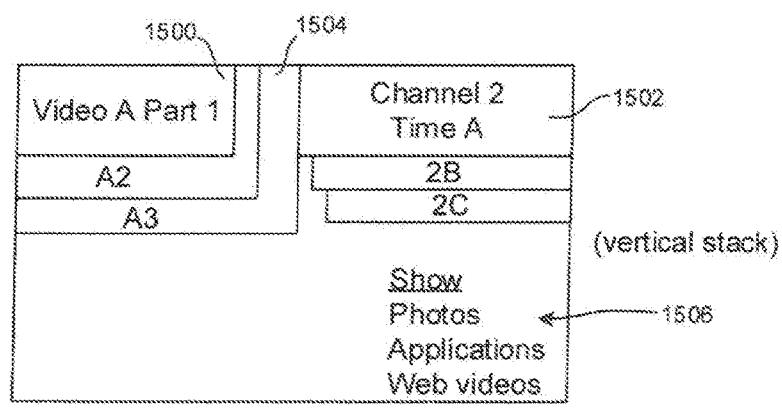
FIG. 15 is a screen shot of an example display presentation consistent with present principles.

FIG. 15 shows a video carousel 1500 and a TV channel carousel 1502, except with the tiles of each carousel stacked vertically, with underlying tiles shown only at the edges 1504 of the tiles. The top-most, fully visible tile is the one in focus. Note that in both FIGS. 14 and 15, only one carousel at a time need be shown. Thus, as shown at 1506 in FIG. 15, a list of other source-related carousels may be presented for selection of a carousel by a consumer for presentation of the selected carousel.

Figure 16:
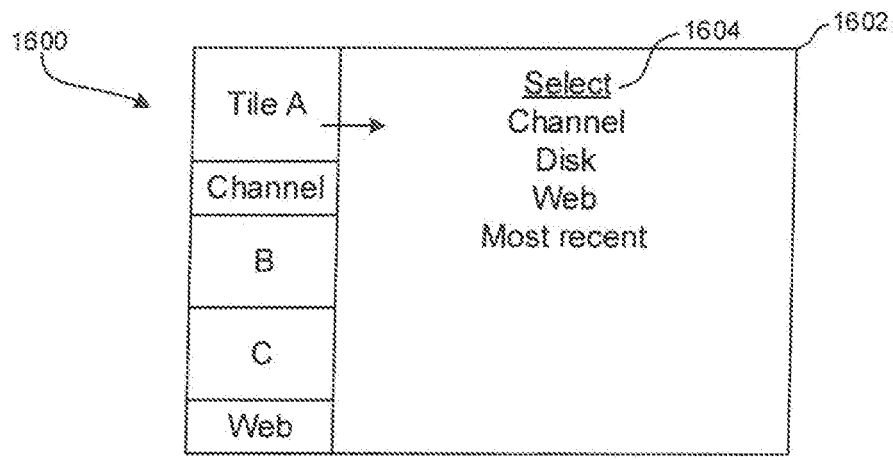
FIG. 16 is a screen shot of an example display presentation consistent with present principles.

In FIG. 16, an example for constructing a carousel is shown. A column 1600 of tiles is arranged on the AVDD 1602 shown, with an assignment list 1604 being presented next to the tiles. The consumer can drag and drop a tile on the desired source type in the list 1604 (or drag and drop a source type in the list onto a tile) or otherwise associate a tile with a source type to thereby associate that tile with the carousel associated with the source type. In the example shown, the tile below "Tile A" has already been associated with a TV channel for association with the TV channel carousel. Likewise, the bottom tile has already been associated with the web video carousel.

Figure 17:
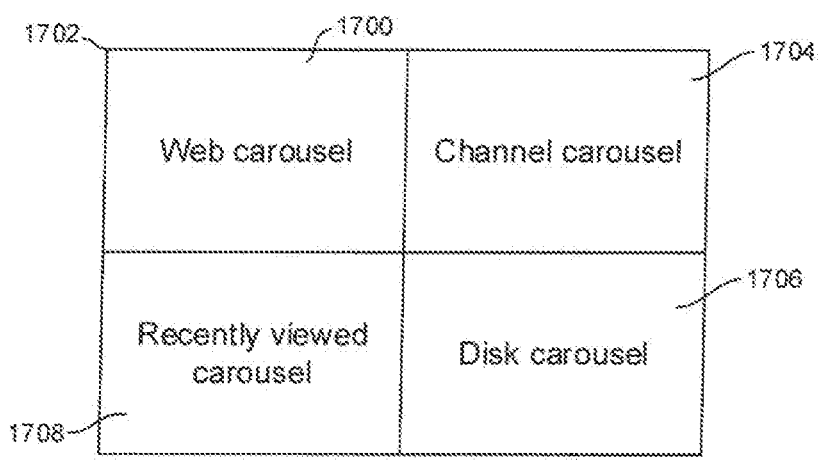
FIG. 17 is a screen shot of an example display presentation consistent with present principles.

FIG. 17 shows that multiple source type carousels such as any of the above may be presented simultaneously. As shown, a web video carousel 1700 may be presented on an AVDD 1702 along with a TV channel carousel 1704, a video disk (e.g., DVD) video carousel 1706, and a recently viewed video carousel 1708, in which tiles represent the "N" most recently viewed video streams regardless of source.

Figure 18:
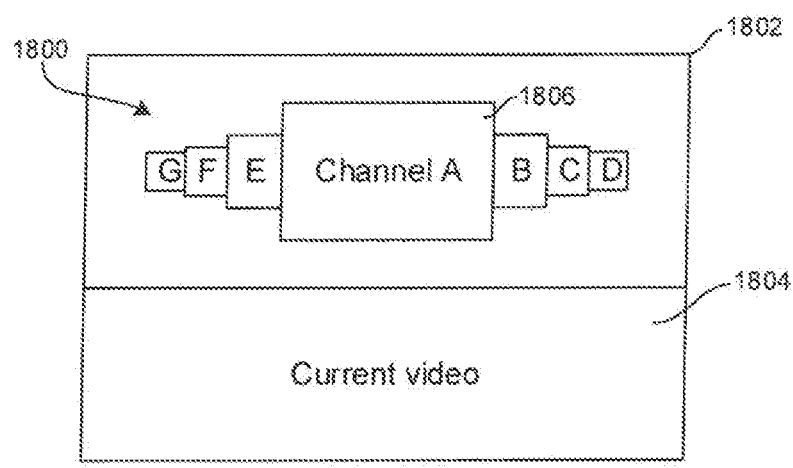
FIG. 18 is a screen shot of an example display presentation consistent with present principles.

FIG. 18 shows that a single carousel 1800 (in this case, containing tiles representing TV channels) can be presented on an AVDD 1802 above a current video pane 1804, although the carousel may appear below the pane or to the left or right of the pane in other embodiments. The carousel 1800 is presented as if the tiles were arranged on a disk, such that the center-most tile 1806 appears larger than the other tiles, which become progressively small from the center-most tile 1806 outward, as rotating disk may appear in three dimensions when viewed perpendicular to the plane of the disk. The middle tile 1806 is in focus, meaning the underlying video asset (decimated as appropriate) is played within it, with each of the remaining tiles presenting still images until the consumer "rotates" them into focus.

The principles of FIG. 18 may also be used to present tiles as being stacked in the Z-dimension, i.e., into the display. The tiles can be depicted as being overlaid on top of each other with depth between each tile's plane. The tiles can be scrolled and this is useful when the viewer wants to see the front tile active with video, yet with enough of the other tiles arranged behind it to recognize the portion still visible. Behind the main front tile in the scrolling z-plane carousel are the upcoming tiles that get larger as they approach the main front tile, analogous to what is shown in FIG. 18. Using the Z-plane in this example is also a way of managing canvas real estate when more than one selection exists and insufficient room exists in the X-Y plane to distribute all of the selections. The type of carousels thus can be used for fast visual search, tagging or dragging a tile the viewer wants onto the X-Y plane for viewing, the X-Y plane template view being a longer term always on experience, unless the viewer wants to view one item in full 4K mode for expanded viewing.

The Z-plane concept can also be used behind a tile that is in the X-Y plane. This concept is similar to the carousel that can be scrolled on the canvas to identify content. In this particular implementation the Z-plane tile exists behind the tile being highlighted or visible within a template. Though it cannot be seen, in place scrolling can be executed in which the next Z-plane choice comes to the front and replaces the tile currently visible. This "in place" tile scrolling is particularly efficient if the viewer is familiar with what is in the carousel associated with a particular tile or content source. It is fast in that the template is not swapped out for a carousel to view in the canvas, or where the template is minimized during search or set back but remains fully in place. The viewer in tile scroll mode simply clicks on that tile repeatedly to have the contents replaced with similar themed content assigned to that tile. In effect there would be a virtual carousel assigned to each tile in the Z-plane behind the tile.

It is to be appreciated that the Z-plane tile model is similar to vertical tiling except that the tiles in the Z-plane model virtually exist behind the primary visible tile and are replaced over sequentially the video currently being populated. The Z-plane tiles can be presented perpendicular to the X-Y plane perfectly, whereas the tiles in a 2D vertical alignment can be offset a bit as if depicting a true carousel in three dimensions. When multiple carousels are visible at once, each carousel may contain tiles representing a respective category of content. For example, a first carousel may represent ports and a second carousel presented along with the first carousel can represent movies.

Each section or tile that represents a discrete piece of content can be managed using an HTML5 canvas element that is controllable with specific WebGL based APIs. The AVDD manufacturer can also build a custom application for menuing that runs faster and utilizes Open GL ES or other graphics acceleration techniques to deliver a fast scrolling feed and to send individual commands to each tile for control. When each tile is highlighted or made active, a series of commands can be executed using XML or JavaScript to program the tile for the desired function.

The embodiment of FIGS. 13-18 can be used for digital signage and hospitality TV, as well as retail displays and how different items available in the store can be scrolled through and selected for expanding live interactivity. Each template may also be keyed to a respective time period of the day, e.g., morning, late afternoon, early evening, late evening.

Figure 19:
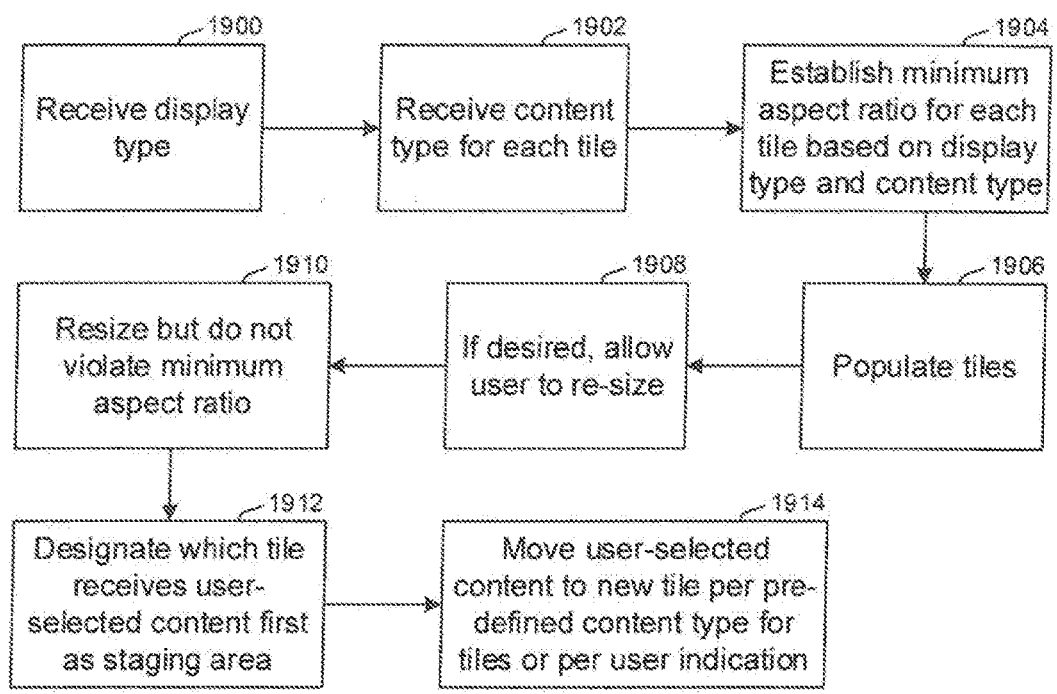
FIG. 19 is a flow chart of example logic consistent with present principles.
Figure 20:
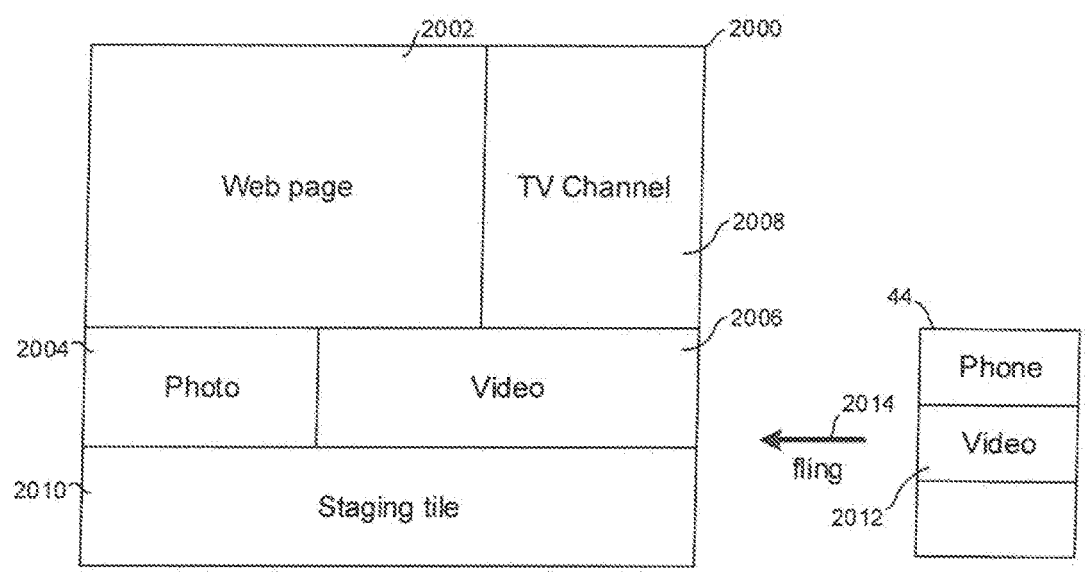
FIG. 20 is a block diagram of a system consistent with present principles.

FIGS. 19 and 20 illustrate Multiview TV Template Creation and Display Layout Modification. Commencing at block 1900, the executing processor (at the AVDD and/or at the service provider, e.g., cable or MSO head end) receives the type of display for which template creation is sought. This provides the size and other characteristics of the device's display.

Moving to block 1902, the content type for each to be presented on the display in a tiled view is received. The selection of content type may be by the consumer associated with the AVDD according to principles described elsewhere herein.

At block 1904, a minimum size configuration (also referred to as "aspect ratios") of each tile is defined or established based on the display type and the type of content selected for that tile. This may be done by using a lookup table constructed by the manufacturer of the AVDD or the service provider that ensures that depending on the type of asset underlying the tile, the tile will be large enough to promote easy discernment from the average (or in some cases visually impaired) viewer.

For example, the table below illustrates:

| Display Type | Min tile AR (content type A) | MinAR (type B) | Min AR (type C) |
| --- | --- | --- | --- |
| 1 | 4" × 6" | 5" × 7" | 8" × 8" |
| 2 | 5" × 7" | 6" × 8" | 9" × 9" |

Proceeding to block 1906, the tiles may be populated by associating them with specific underlying assets of the content type defined for the tile. Moving to block 1908, in some implementations the consumer may be given the option of resizing one or more tiles by, e.g., dragging and dropping a corner or edge of a tile outward or inward to expand or contract the tile size, with the other tiles being automatically expanded or contracted accordingly. Or, if a touch screen display is used, pinches in or out on a tile can be used to contract or expand the tile.

Block 1910 indicates that as tiles are automatically resized, the minimum ARs for each tile (which recall is based on the type of display and type of content assigned to the tile) act as limits in resizing. Thus, for instance, no tile may be resized to less than its minimum AR. This limit can also apply to consumer-input tile contractions, in which a tile cannot be contracted to be smaller than its minimum AR regardless of consumer input attempting to do so. If a tile cannot be automatically resized to both conform to its minimum AR and remain on the display canvas, it can be removed, as a default.

Also, the consumer may be allowed at block 1912 to designate which tile is to be used as a "staging area" to receive newly selected content for presentation in a Multi-view. Proceeding to block 1914, consumer-selected content is moved from the staging area to a new tile per the tile's pre-defined content type (if it matches the type of selected content) or per other consumer indication if desired.

Note that content types may include not only TV video and other video but also calendars, web spaces, etc., and that this comment applies to all embodiments herein unless otherwise indicated. Thus, in the example shown in FIG. 20, an AVDD 2000 presents a web page in a web page tile 2002, a photograph in a smaller photograph tile 2004, and a video in a video tile 2006. A TV channel is presented in a TV tile 2008. As shown, each of the tiles 2002, 2004, 2006, 2008 has a different AR than the other content tiles. The above-described staging area 2010 is also shown. A CE device such as the CE device 44 shown in FIG. 1 and implemented as, e.g., a smart phone or tablet computer can present video 2012 on a touch display which can be swiped by a consumer in the direction of the arrow 2014 to "throw" the video 2012 into the staging area 2010.

Thus, the size or aspect ratio for each tile described above can be set by the consumer and be fixed in place, or it can be dynamically adjusted or resized to fit additional content or information being sent to the AVDD display. The AVDD adjusts to place the sections of content together and utilize the available space, based on template parameters set by the AVDD manufacturer, service provider, or consumer. Fixed templates or designed templates are comprised of various tiles or sections and can be mapped to different types of content sources, such as videos, webpages, photos, graphical data streams to make up a custom view. These templates or custom views can be saved or stored and also assigned permanent content sources that send the latest feed or information to each tile persistently. This creates unique views that can be preserved and stored for future retrieval. Saved themes or templates with their corresponding metadata can be shared by the consumer, and sent to other networked AVDDs for viewing by friends or family.

Because the tiles are constrained by the resolution of the AVDD and the size of the AVDD display, there is a limit as to how much content can be reasonably displayed at once on the AVDD screen. As described above, an algorithm incorporating visual limits for each type of content specifies minimum aspect ratios for video, audio placards, web pages, pictures, graphical representations to serve as reference points for dynamic display adjustment when new content is added. This prevents sections from being too small to read or not large enough for acceptable video quality. Also, fixed templates have already been assigned aspect ratios and sized for the individual tiles comprising the template. Templated tiles can also be given priority such that one tile receives new content first as a staging area. This prioritization of tiles enables tablets or phones to fling or send content to the TV screen which can then target an individual tile by order of priority. A particular tile then becomes preset for that particular type of content.

As understood herein, large HD and UHD displays can function akin to a billboard of daily activity that can track many aspects of home life or activity. And that means various tiles or sections will need to be dynamically updated and resized as the display's information changes over the course of a day. Also, different times of the day will allow for different themed templates which can be preconfigured to pull content or be sent content.

HTML5 web applications that utilize Web GL, JavaScript, XML, MSE (Media Source Extensions) and EME (Encrypted Media Extensions) are a flexible way to implement present principles.

FIGS. 21-24 depict a High Resolution AVDD Ad Bar. The popup advertisement bar can be controlled by the broadcaster so that the ad appearing would be consistent with the ad breaks and national ad spots negotiated by the channel or content owner. However, the AVDD manufacturer alternatively may control the pop-up bar for advertising for IP content that is not delivered through a pay TV service or using Pay-per-view. The popup bar for ads thus can be a useful tool for generating ad exposure using ACR and IP video coming from a source that the consumer seeks out and is not part of the typical ad inventory allocated to premium pay TV video.

Figure 21:
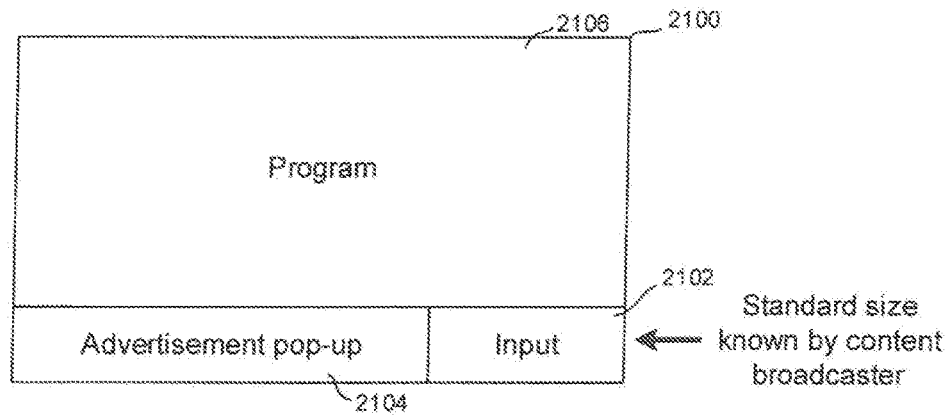
FIG. 21 is a screen shot of an example display presentation consistent with present principles, schematically showing an input of the AVDD for receiving advertising separate from the broadcast video input.
Figure 22:
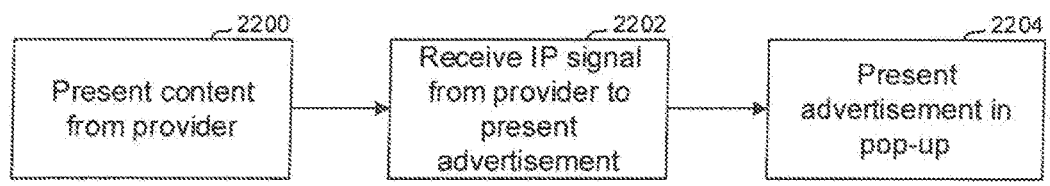
FIG. 22 is a flow chart of example logic consistent with present principles.

An AVDD 2100 in FIG. 21 can receive, at an input 2102 that is different from the input on which content is received from the MSO/service provider, advertisements in an AVDD-controlled pop up bar 2104 that can be triggered by the TV channel, broadcaster, or service operator. Instead of inserting advertisements into the broadcast stream as is currently done, HTML templates are established for ad popups to offer advertising agencies and broadcast networks a way to play advertisements during programs but not to disrupt the programming. The graphical or video advertisements appear in the popup bar 210 at the bottom (as shown) or side of the screen and are triggered by IP signals coming from the content source at block 2200 of FIG. 22 for the purpose of sending IP advertisements. The IP triggers are received at block 2202 and the associated advertisement is presents in the popup bar 2104 at block 2204. The location on the AVDD at which the popup bar 2104 is presented may depend on the type of content, template in use, etc. so that the location can change dynamically as the consumer views the AVDD.

Figure 23:
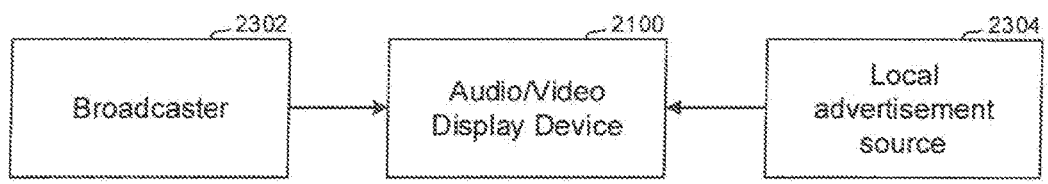
FIG. 23 is a block diagram of a system consistent with present principles.

As shown in FIG. 23, the AVDD 2100 receives content for presentation in a main content window 2106 from a broadcaster 2302 or other service provider. While the triggers that cause or permit advertisements to be presented in the popup bar 2104 may be received from the broadcaster 2302, the content of the advertisements preferably is received from a local advertisement source 2304 such as a local hospitality establishment, local TV station, etc. Alternatively, the advertisements may be received from, e.g., a web server operated by the broadcaster.

The advertisements can display graphics, video and data in a concise format and can be either superimposed on the video in the program window 2106, or the video in the program window 2106 may be slightly decimated and the popup bar 2104 placed in the resulting empty display space, since the size of the popup bar 2104 is known to both the broadcaster and other affected concerns. The AVDD 2100 can automatically mute the audio of the program in the window 2106 and then playback the advertisement automatically. Each advertisement may be of a standard configuration so that the broadcasters know how much space to allocate for each form of content video, graphics, and text. In any case, the popup bar 2104 is at least partially controlled or activated by the broadcaster, thus allowing the program provider to decide advertisement breaks or presentations.

Figure 24:
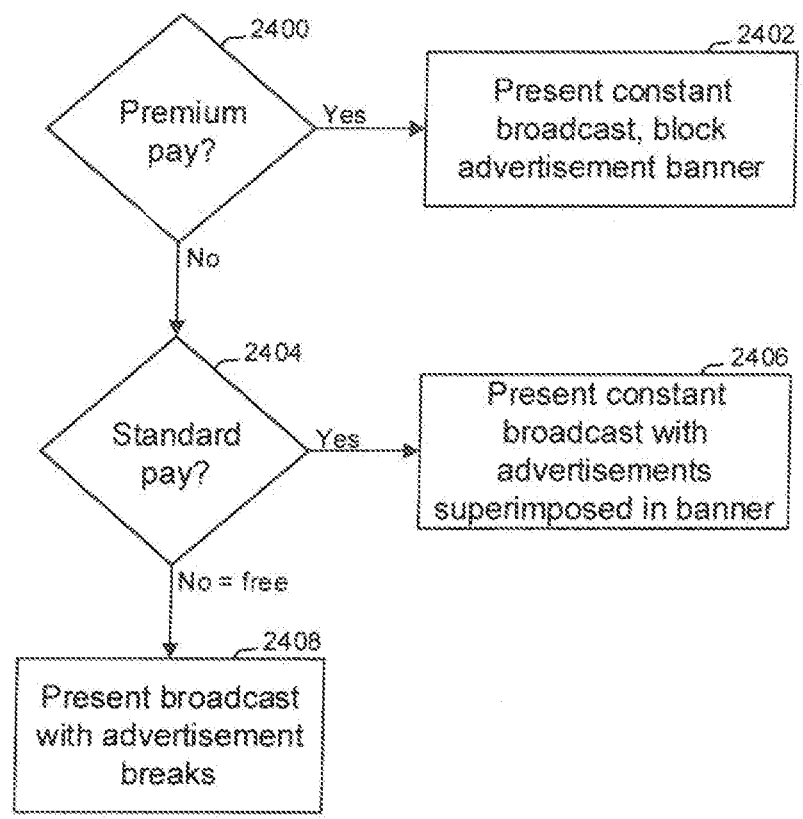
FIG. 24 is a flow chart of example logic consistent with present principles.

FIG. 24 illustrates a service model that uses the popup bar 2104 concept described above. While FIG. 24 is presented in flow chart format for ease of disclosure, it is to be understood that it equally represents state logic that can be actuated once the specific level of service is established.

If a premium level of service is being provided to the consumer via the AVDD 2100 at diamond 2400, received broadcast content may be presented, undecimated, on the entire canvas of the AVDD 2100. Presentation of the popup bar 2104 is blocked, such that uninterrupted viewing of an advertising-free broadcast content is afforded in the premium level of service.

On the other hand, if a standard level of service is being provided at diamond 2404, the above-described advertisements may be presented in the popup bar 2104 at block 2406 simultaneously with presenting the broadcast content in the window 2106, again without interrupting the broadcast program by the nuisance of advertisements embedded in the program. However, if the lowest level of service is provided, conventional programs including embedded advertising that interrupts the program may be provided to the AVDD at block 2408. The level of service used may be established by the consumer by, e.g., making appropriate low, medium, and high payments to the MSO or other content provider.

Figure 25:
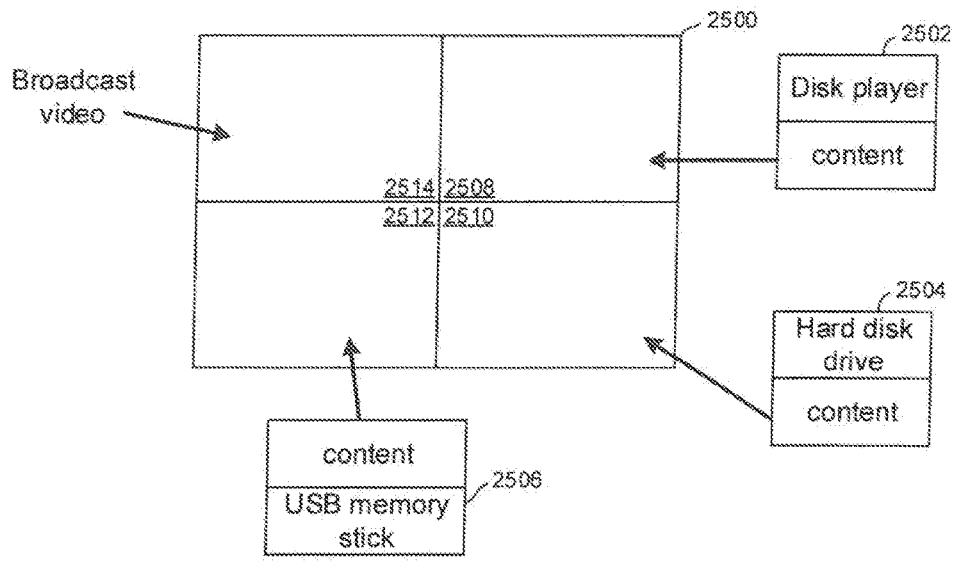
FIG. 25 is a block diagram of a system consistent with present principles.
Figure 26:
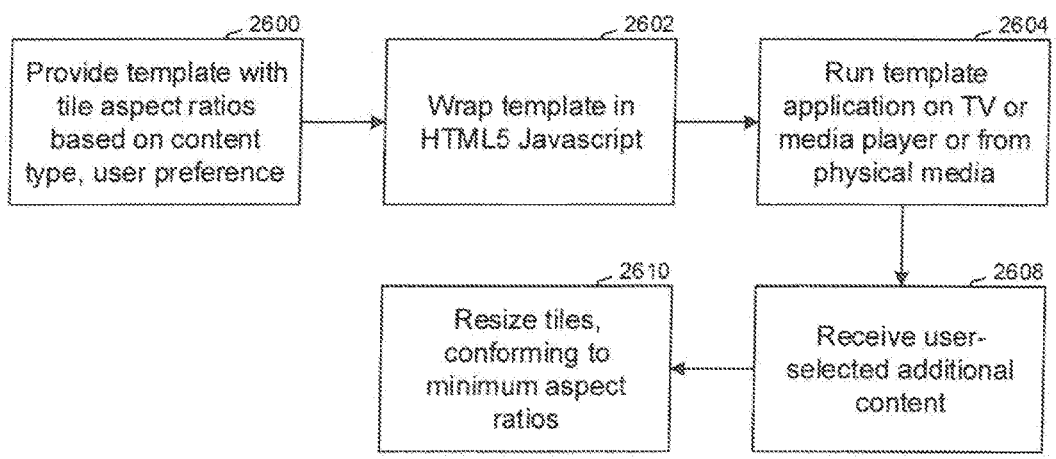
FIG. 26 is a flow chart of example logic consistent with present principles.

FIGS. 25 and 26 illustrate a technique by which multiple streams of content can be delivered to a single AVDD 2500 from various physical media such as a Blu-ray disc player 2502 or a physical hard drive 2504 of a digital media player or a universal serial bus (USB) portable memory 2506. Respective content from each physical medium is presented in a respective tile 2508, 2510, 2512 of a tile presentation on the AVDD, such that the content in the tiles is presented simultaneously with broadcast content in a tile 2514.

FIG. 26 illustrates further. At block 2600 one or more visual templates are provided and may be defined from XML files or Javascript to create segmented sections of content that can be displayed simultaneously on the AVDD 2500. The tiles and/or templates may be defined in part based on the type of content to be presented in the tiles and user preferences.

Essentially, an application residing on physical media allows for multiple sources of content to be displayed in a synchronized fashion with the video playing in to a single AVDD. The use of templated views allows for each video or content source to be independently controlled and metadata to be assigned to each source. The sources are treated as objects within the entire video canvas of the AVDD screen and are assigned to a single tile or segment of the screen by use of the templated controls. The template controls determine the aspect ratio and size of the segments which show content based on the type of content, consumer preferences for size, and how the content fits together on the larger AVDD canvas. Each segment within the larger AVDD canvas can be resized dynamically as new content is added.

The physical media does not have to be running an application that creates the template, as this template normally would reside in the AVDD firmware and pull streams from the physical media. However, the physical media equally could have an HTML5 application designed specifically by the content creators for displaying their curated content.

At block 2602, the templated content streams coming from the application may be wrapped in an HTML and Javascript web application that accesses all of the various content streams from the various media and organizes them in the same manner as the AVDD otherwise would. Thus, the functionality can reside on the AVDD or any other playback device or even the physical media 2502, 2504, 2506. The only difference is whether the application is embedded in the AVDD, the external player, or within the physical media application. Regardless of where the template application resides, it is run at block 2604 to present the templated view shown in FIG. 25.

The playback of content from digital media located on physical media, or a physical player's hard drive, that is then combined or integrated with other media for a multiview experience that allows additional experiences to be built around the primary experience of watching the video, such as web based curated content that synchronizes with the media or social experiences designed for the purpose of sharing media experiences.

If desired, user-selected additional content may be received at block 2608 for presentation along with the tiles shown in FIG. 25. In this case, the logic may move to block 2610 to resize the tiles, conforming to any minimum ARs consistent with disclosure above.

Multiview as an Application for Physical Digital Media allows multiview experiences to become portable to other playback devices and displays and allows content to be staged for viewing such as at an event, or in a store, or in a lobby of a hotel, or in a stadium for digital signage or hospitality or for a consumer to carry the application with them when they travel.

While the particular CONTENT SURFING, PREVIEW AND SELECTION BY SEQUENTIALLY CONNECTING TILED CONTENT CHANNELS is herein shown and described in detail, it is to be understood that the subject matter which is encompassed by the present invention is limited only by the claims.

What is claimed is:
1. A device comprising:
at least one processor; and
at least one computer memory that is not a transitory signal and that comprises instructions executable by the at least one processor to:
present on a display device a user interface (UI) comprising plural tiles each being associated with a respective content;
receive user input correlating a first tile in the plural tiles with a first source type;
responsive to the user input, associate the first tile with the first source type to associate the first tile with a first carousel associated with the first source type;
receive subsequent user inputs associating plural tiles with respective source types;
establish respective carousels for each respective source type, each carousel comprising content associated with the respective source type as established by the user inputs associating plural tiles with respective source types; and
after establishing the respective carousels, present plural of the carousels simultaneously on the display device for selection of content from the carousels, the source types of respective carousels comprising a computer network source type, a broadcast channel source type, and a recently viewed video source type such that a first carousel is configured to present tiles representing content from a computer network, a second carousel is configured to present tiles representing content from currently live broadcasts, and a third carousel is configured to present tiles representing content from recently viewed videos.

2. The device of claim 1, further comprising the at least one display device, the at least one display device including a high definition or ultra-high definition video display.

3. The device of claim 1, wherein the instructions are executable to scroll tiles on and off the display in a carousel format responsive to a user-input scroll command.

4. The device of claim 1, wherein second tiles in the UI represent respective TV channels, and third tiles in the UI represent one or more of: software applications, web pages, graphical data feeds.

5. The device of claim 1, wherein the UI includes two horizontally-arranged carousels of tiles, a first carousel having tiles representing underlying assets from local or cloud-based storage, and a second carousel having tiles representing underlying TV channels, the first carousel being rotatable independently of the second carousel.

6. The device of claim 1, wherein the UI includes a video carousel of tiles each representing a respective video, the tiles of the video carousel being stacked vertically, with a top tile being completely shown and tiles underlying the top tile shown only at first and second edges of the tiles underlying the top tile, the top tile being an upper-most tile in the carousel that is closest to an upper edge of the display device than the other tiles in the carousel.

7. The device of claim 1, wherein the UI includes a video carousel of tiles each representing a respective video, the tiles of the video carousel being depicted as being in a sequence along a Z-dimension perpendicular to the display.

8. The device of claim 1, wherein the first tile becomes in screen focus by virtue of a scroll command rotating a carousel comprising the plural tiles until the first tile is in a central portion of a tiled view of the UI.

9. A method for establishing a carousel of tiles for a user interface (UI) presentable on a display, comprising:
presenting a column of tiles on the display;
receiving user inputs associating plural tiles with respective source types;
establishing respective carousels for each respective source type, each carousel comprising content associated with the respective source type as established by the user inputs associating plural tiles with respective source types; and
after establishing the carousels, presenting plural of the carousels simultaneously on the display device for selection of content from the carousels, the source types of respective carousels comprising a computer network source type, a broadcast channel source type, and a recently viewed video source type, the carousels being independently rotatable on screen such that a first carousel is configured to present tiles representing content from a computer network, a second carousel is configured to present tiles representing content from currently live broadcast, and a third carousel is configured to present tiles representing content from recently viewed videos.

10. The method of claim 9, wherein the source types of respective carousels include a TV channel source, a web page source, a disk-based source, and a data structure recording recently viewed content.

11. The method of claim 9, comprising presenting a list of source-related carousels for selection of a carousel from the list for presentation of the selected carousel.

12. The method of claim 9, wherein first and second carousels are keyed to respective first and second time periods of a day.

13. An apparatus comprising:
at least one display;
at least one processor; and
at least one computer memory with instructions executable by the at least one processor to present plural carousels of tiles in a user interface (UI) on the display, the instructions being executable to:
receive user inputs associating plural tiles with respective source types;
establish respective carousels for each respective source type, each carousel comprising content associated with the respective source type as established by the user inputs associating plural tiles with respective source types; and
after establishing the carousels, present plural of the carousels simultaneously on the display for selection of content from the carousels, the source types of respective carousels comprising a computer network source type and a broadcast channel source type, the carousels being independently rotatable on the display such that a first carousel is configured to present tiles representing content from a computer network, a second carousel is configured to present tiles representing content from currently live broadcast, and a third carousel is configured to present tiles representing content from recently viewed videos.

14. The apparatus of claim 13, wherein the instructions are executable to:
present video in a center-most tile responsive to the center-most tile being in focus by virtue of being the center-most tile.

15. The apparatus of claim 14, wherein the instructions are executable to:
present no video in tiles other than the center-most tile.

16. The apparatus of claim 13, wherein the instructions are executable to:
cause a carousel to appear to rotate responsive to a scroll command such that a center-most tile moves away from a center-most location and a second tile moves into the center-most location and becomes in focus, in which a still image is replaced with video in the second tile.

* * * * *